US012151253B2

(12) United States Patent
Zandonà

(10) Patent No.: US 12,151,253 B2
(45) Date of Patent: Nov. 26, 2024

(54) DOWN-LOCK BELLOWS PUMP

(71) Applicant: TAPLAST s.r.l., Vicenza (IT)

(72) Inventor: Raffaele Zandonà, San Pietro in Gu (IT)

(73) Assignee: TAPLAST s.r.l. (IT)

( * ) Notice: Subject to any disclaimer, the term of this patent is extended or adjusted under 35 U.S.C. 154(b) by 156 days.

(21) Appl. No.: 17/775,702

(22) PCT Filed: Nov. 16, 2020

(86) PCT No.: PCT/EP2020/082302
§ 371 (c)(1),
(2) Date: May 10, 2022

(87) PCT Pub. No.: WO2021/094621
PCT Pub. Date: May 20, 2021

(65) Prior Publication Data

US 2023/0034207 A1 Feb. 2, 2023

(30) Foreign Application Priority Data

Nov. 15, 2019 (IT) ........................ 102019000021321

(51) Int. Cl.
*B05B 11/00* (2023.01)
*B05B 11/10* (2023.01)
(Continued)

(52) U.S. Cl.
CPC ...... *B05B 11/0005* (2013.01); *B05B 11/0044* (2018.08); *B05B 11/1001* (2023.01);
(Continued)

(58) Field of Classification Search
CPC ............. B05B 11/1074; B05B 11/1077; B05B 11/1059; B05B 11/1035; B05B 11/1023;
(Continued)

(56) References Cited

U.S. PATENT DOCUMENTS 5,899,363 A 5/1999 Bliss et al.
6,672,486 B2 * 1/2004 Santagiuliana ..... B05B 11/1077 222/207

(Continued)

FOREIGN PATENT DOCUMENTS

WO 9935079 A1 7/1999
WO 2008045822 A2 4/2008

OTHER PUBLICATIONS

International Search Report and Written Opinion mailed Feb. 26, 2021; International Patent Application No. PCT/EP2020/082302 filed Nov. 16, 2020. ISA/EP.

*Primary Examiner* — Peter J Bertheaud
(74) *Attorney, Agent, or Firm* — McDonald Hopkins LLC

(57) ABSTRACT

An all-polymer reciprocating pump (100) is contemplated. The pump body (160) receives a sliding insert (170) that may be locked in a down position to minimize the extension and profile of the actuator (120) while the pump (100) is not in use (e.g., for purposes of shipping in e-commerce). Projections (171) slide within guides (181) formed on an insert housing (180). Even in this down locked position, minimal compression is applied to the biasing members (130) so as to avoid fatigue, wear, and/or failure of the plastic components.

13 Claims, 18 Drawing Sheets

(51) Int. Cl.
*F04B 19/04* (2006.01)
*F04B 43/00* (2006.01)

(52) U.S. Cl.
CPC ...... *B05B 11/1023* (2023.01); *B05B 11/1035* (2023.01); *B05B 11/1047* (2023.01); *B05B 11/1059* (2023.01); *B05B 11/106* (2023.01); *B05B 11/1074* (2023.01); *B05B 11/1077* (2023.01); *F04B 19/04* (2013.01); *F04B 43/0009* (2013.01)

(58) Field of Classification Search
CPC ............. B05B 11/1047; B05B 11/0044; B05B 11/1001; B05B 11/106; B05B 11/0005; F04B 19/04; F04B 43/0009
See application file for complete search history.

(56) References Cited

U.S. PATENT DOCUMENTS

| | | | | |
|---|---|---|---|---|
| 9,539,597 | B2 * | 1/2017 | Ding .................. | B05B 11/0027 |
| 10,252,841 | B2 | 4/2019 | Knight | |
| 2011/0297700 | A1 * | 12/2011 | Santagiuliana ....... | B05B 11/106 222/336 |
| 2017/0216864 | A1 | 8/2017 | Knight | |
| 2018/0304291 | A1 | 10/2018 | Knight | |
| 2018/0318861 | A1 | 11/2018 | Knight | |

* cited by examiner

DOWN-LOCK BELLOWS PUMP

CROSS-REFERENCE TO RELATED APPLICATION

This application is a 35 U.S.C. 371 national stage filing of PCT Application No. PCT/EP2020/082302 filed on Nov. 16, 2020, entitled "DOWN-LOCK BELLOWS PUMP," which claims priority to Italian Patent Application No. 102019000021321 filed on Nov. 15, 2019; each of which are incorporated by reference herein in their entireties.

TECHNICAL FIELD

This application relates generally to pump dispensers and, more specifically, to a bellows pump made from recyclable materials (e.g., a single grade of polymeric plastic or a combination of such plastics that are compatible with and amenable to current recycling programs) in which a lock-down function allows shipment of the pump without compression of the bellows itself.

BACKGROUND

Containers for everyday household fluid products, such as soaps, cleaners, oils, consumable liquids, and the like, can be outfitted with dispensing pumps to improve a consumer's ability to access and use the fluid. Dispensing pumps of this type usually rely upon a reciprocating pump, driven by a compressible biasing member.

In reciprocating pumps, the axial distance the plunger travels during actuation draws fluid into the pumping chamber. Therefore, the ability for a pump to repeatedly and reliably contract and expand (i.e., reciprocating action) is critical.

Conventionally, dispenser pumps have used metal springs to provide the biasing force necessary to drive the reciprocating action. Metal springs were considered particularly useful because they much less prone to fatigue, wear, and failure in comparison to existing non-metal alternatives, such as plastic coils.

However, one significant drawback with metal springs is that they must be disassembled before they can be introduced into a recycling stream. As more and more governments and agencies adopt sustainable rules premised on recycling, the use of metal springs in dispenser pumps is becoming increasingly undesirable.

Alternatives to metal springs can be found in U.S. Pat. Nos. 6,672,486 and 10,252,841 and United States Patent Publications 2018/318861 and 2017/216864, all of which are incorporated by reference. Generally speaking, these disclosures can be grouped into two types of plastic-based alternatives: accordion-style "bellows" and segmented, deformable "domes".

In the bellows disclosures, a hollow body defines a suction and compression chamber. An elastic bellows, associated with the hollow body, serves as a biasing member or spring to facilitate the reciprocating action of the pump, thereby drawing fluid through the hollow body for dispensing. The bellows, along with all other major components, can be made from recyclable polymeric materials, without the need for any metal components.

In the segmented domes, a resiliently compressible plastic dome can be deformed by compressing its top central section. As the dome returns to its original, expanded shape, fluid is drawn into the dome (and subsequently expelled for dispensing on the next depression/actuation cycle). Here again, the need for metal components is eliminated.

Of course, the nature of polymeric materials makes them more susceptible to fatigue, wear, and failure in comparison to conventional metal springs. Therefore, it would be desirable to avoid unnecessarily compressing these biasing members except to the extent necessary to dispense fluids.

However, the rise of e-commerce has placed even greater demands on pumps that can serve as shippable packages. That is, manufacturers prefer designs whereby the container can be shipped as-is, without the need for additional boxes or other packaging. In that regard, reciprocating pumps—and especially those relying on biasing members (metal or plastic)—pose challenges because the pump head is constantly being urged into an upward position, which makes the container prone to leakage and damage.

A pump with reduced dimensions, owing to a reliable "lock down" mechanism would be welcome. Further, to the extent that lock down mechanism did not compress the biasing element, it would provide the opportunity to use plastic springs and elements without unnecessarily stressing the spring thereby improving its useful life. Ultimately, this results in a compressed design with reduced dimensions (particularly with respect to axial height).

Object of the present invention is a dispenser pump capable of being locked in operational and stocking positions without unwanted compression of components, the pump comprising:

- an actuator defining a fluid flow path having an outlet and attached to a top end of a biasing member;
- a closure body including a cylindrical skirt and a central aperture which allows for reciprocating motion of the actuator therethrough; and
- a pump body having an outer housing fixed to the closure body, said outer housing coaxially receiving portions of the actuator within a pump chamber formed inside the outer housing and with a sliding insert slidably received within an insert housing, wherein the insert housing is fixed to the outer housing and wherein guides and stoppers formed on an inner facing of the insert housing cooperate with projections extending radially outward from an outer facing of the insert so as to allow the actuator to be selectively locked upwardly in an operable position and locked downwardly in a stocked position without substantial compression of the biasing member.

Some of the preferred features of the dispenser pump according to the present invention are object of the dependent claims.

DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

FIG. 6A is an isolated three dimensional perspective view of the sliding insert, while

FIG. 18A is an isolated three dimensional perspective view of the underside of the actuator head according to the third embodiment, while

DESCRIPTION

Figure 1:
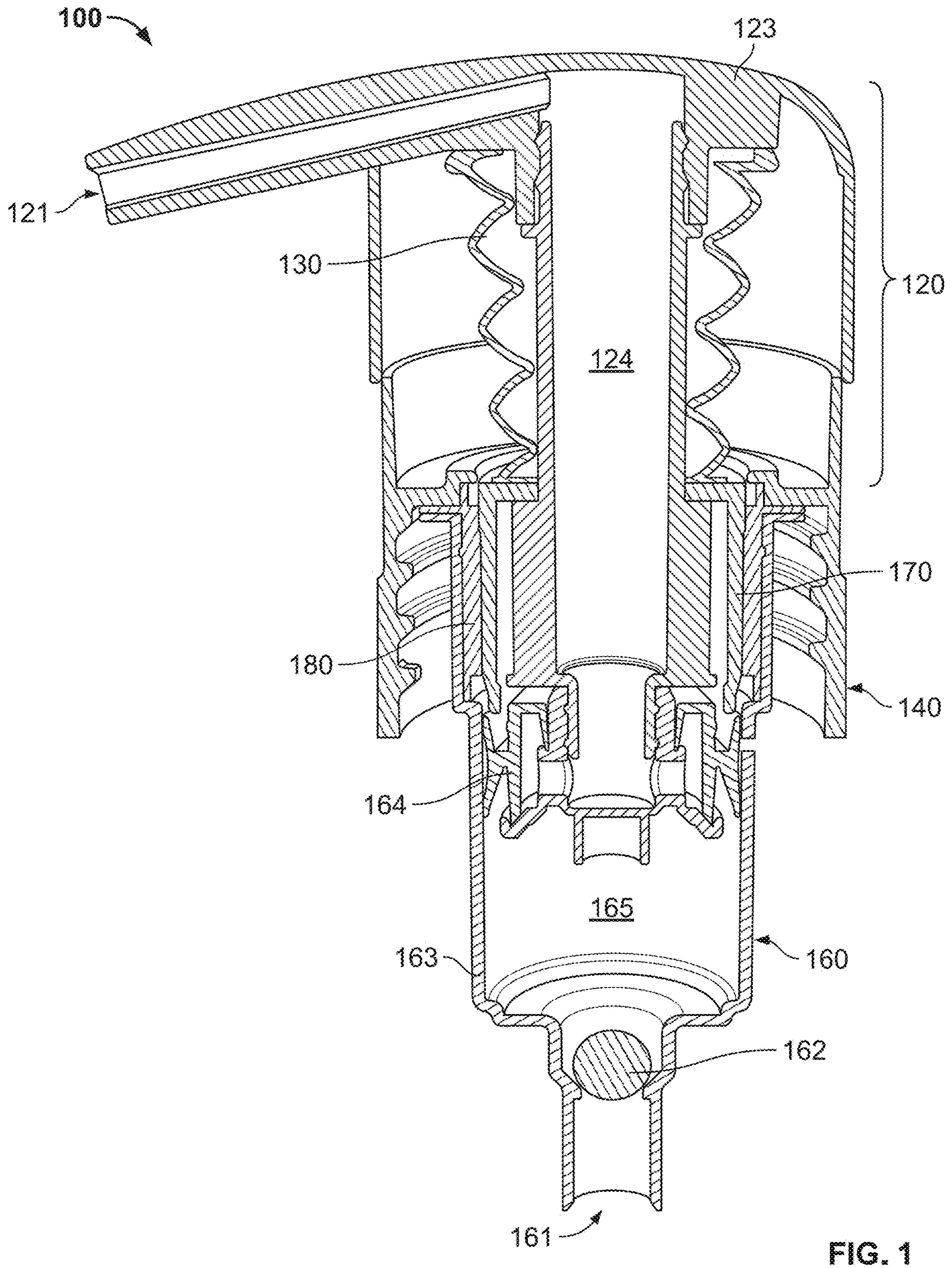
FIG. 1 shows a cross sectional side view of the pump in the locked down position, including the actuator head, bellow, pump chamber, and ball valve according to a first embodiment of the invention.
Figure 2A:
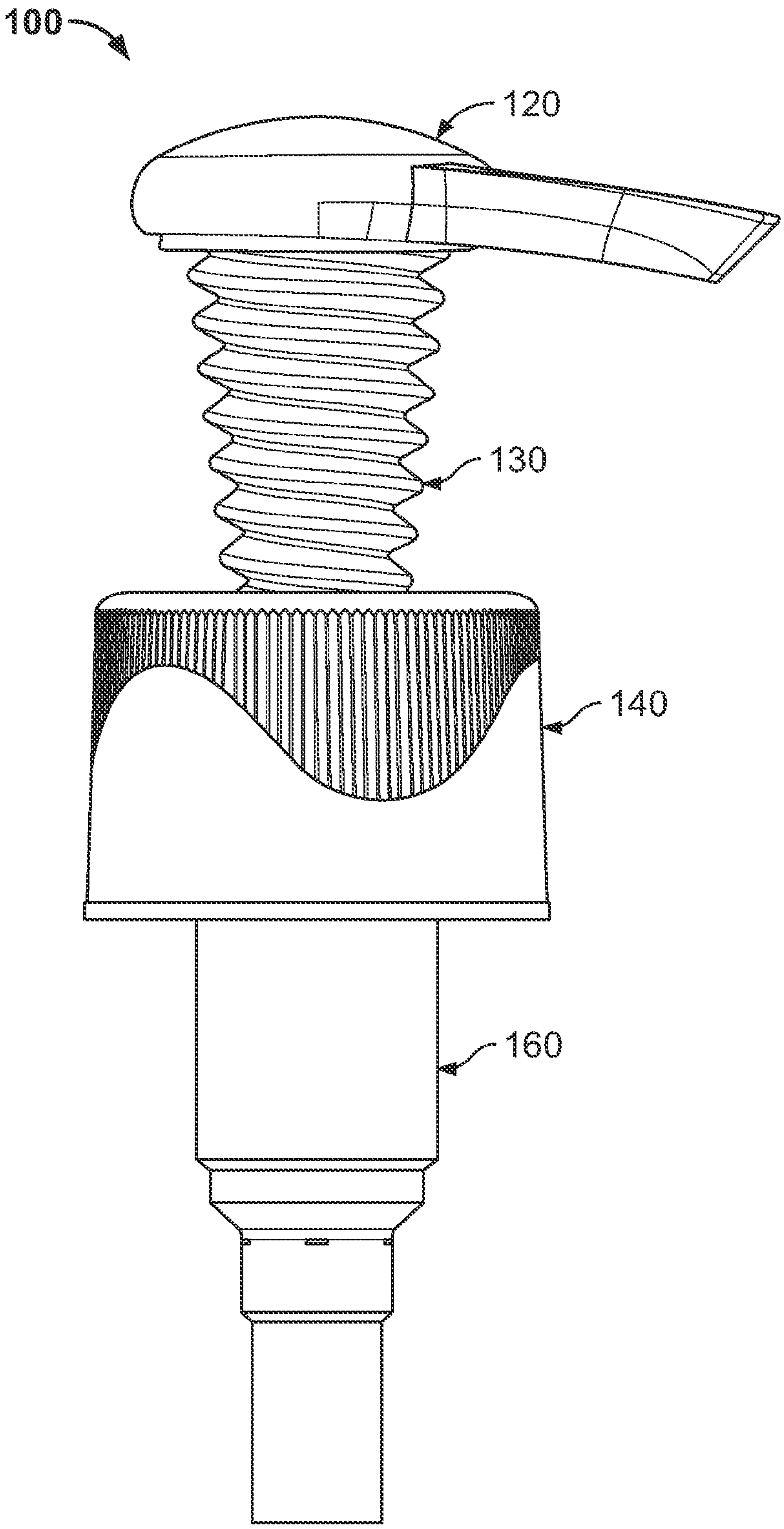
FIG. 2A is a side view of the pump exterior in the operating or up locked position according a second embodiment.
Figure 2B:
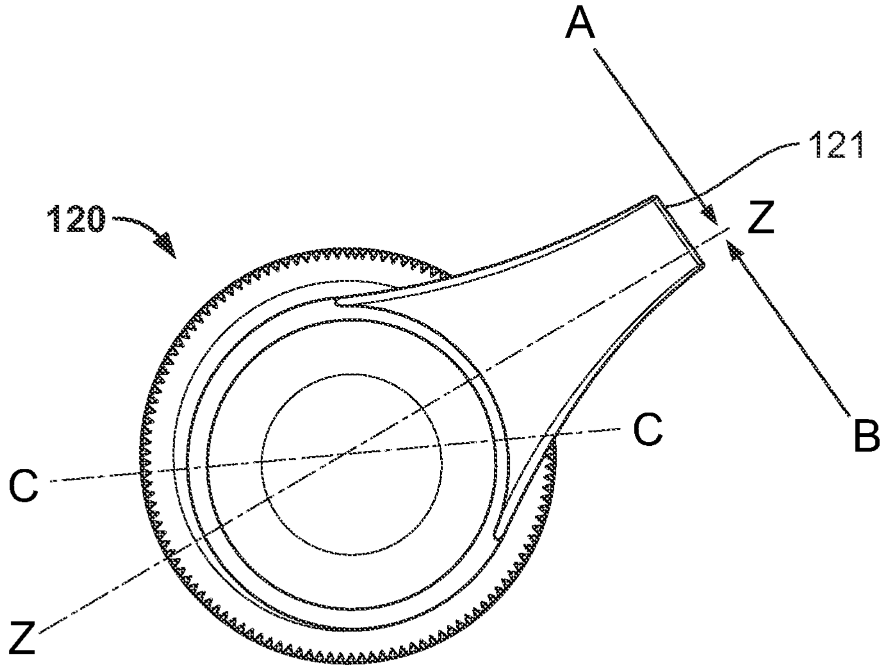
FIG. 2B is a top view of the actuator head of the pump in FIG. 2A, with line C-C representing the cross sectional axis shown in FIGS. 3 and 5. Arrow A indicates the perspective (relative to axis Z-Z) for the exterior views of FIGS. 2A, 11, and 13, as well as the sectional views of FIG. 3. Arrow B shows the perspective (relative to axis Z-Z) for the exterior view in FIG. 4 and the sectional views of FIGS. 5, 12, and 14.
Figure 3:
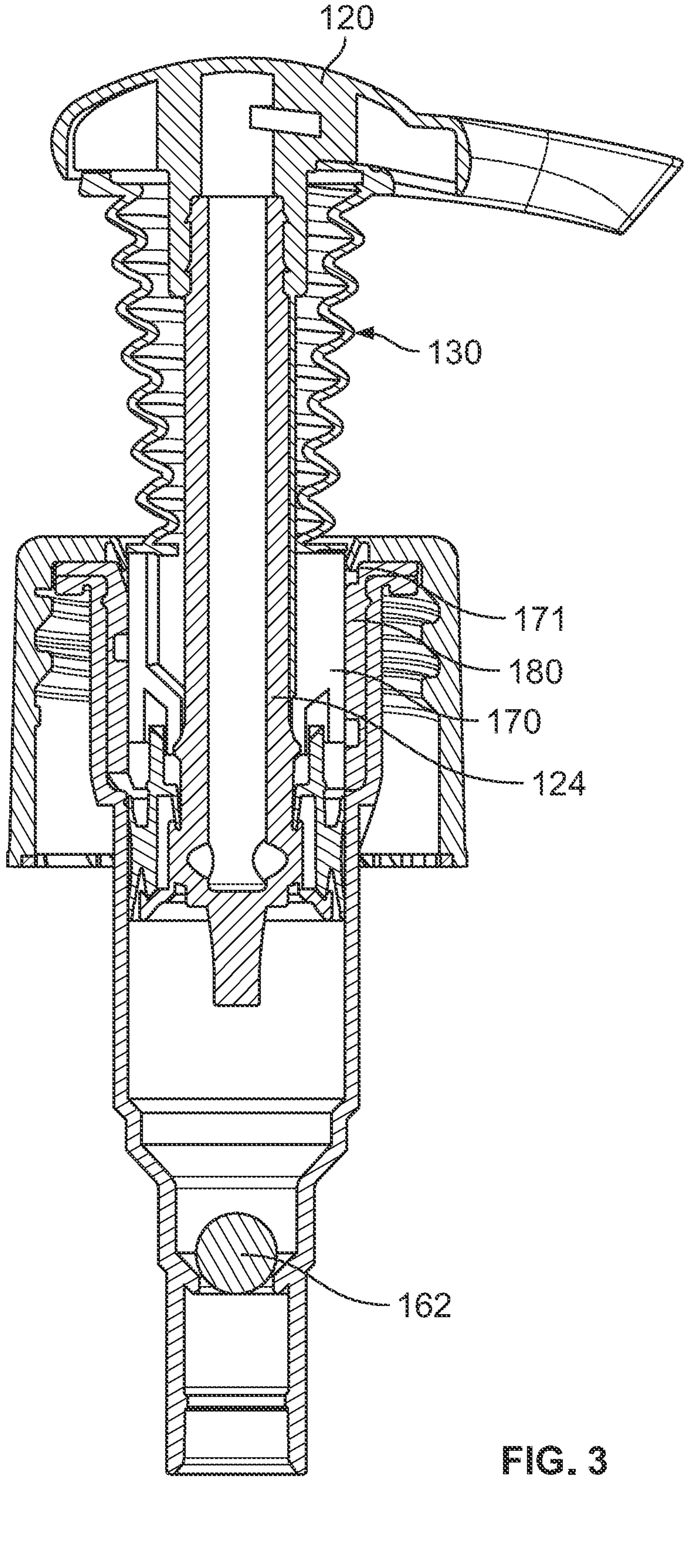
FIG. 3 is a cross sectional view of the pump in FIG. 2A.
Figure 4:
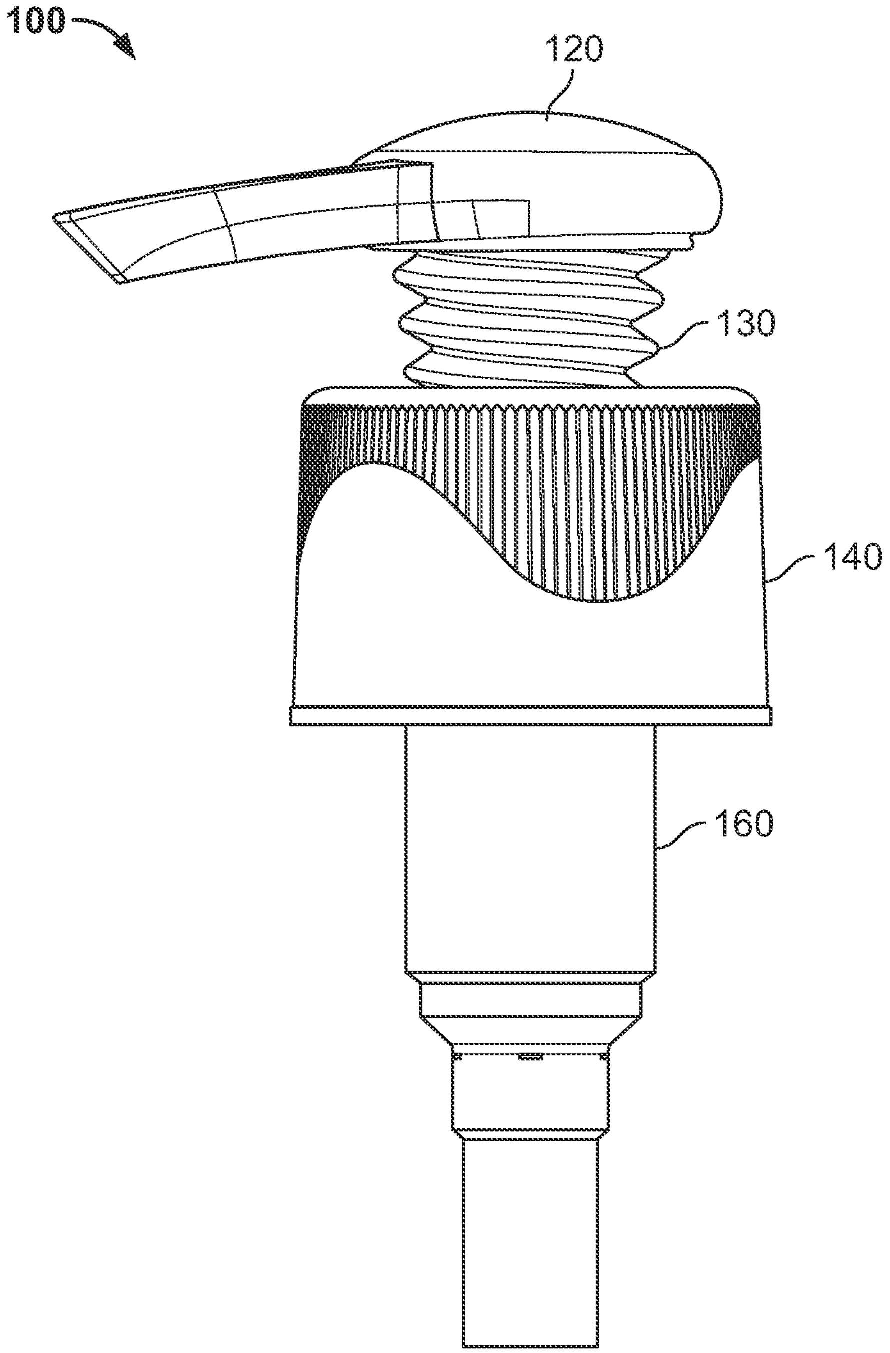
FIG. 4 is a side view of the pump exterior in the stocking or down locked position according to the second embodiment.
Figure 5:
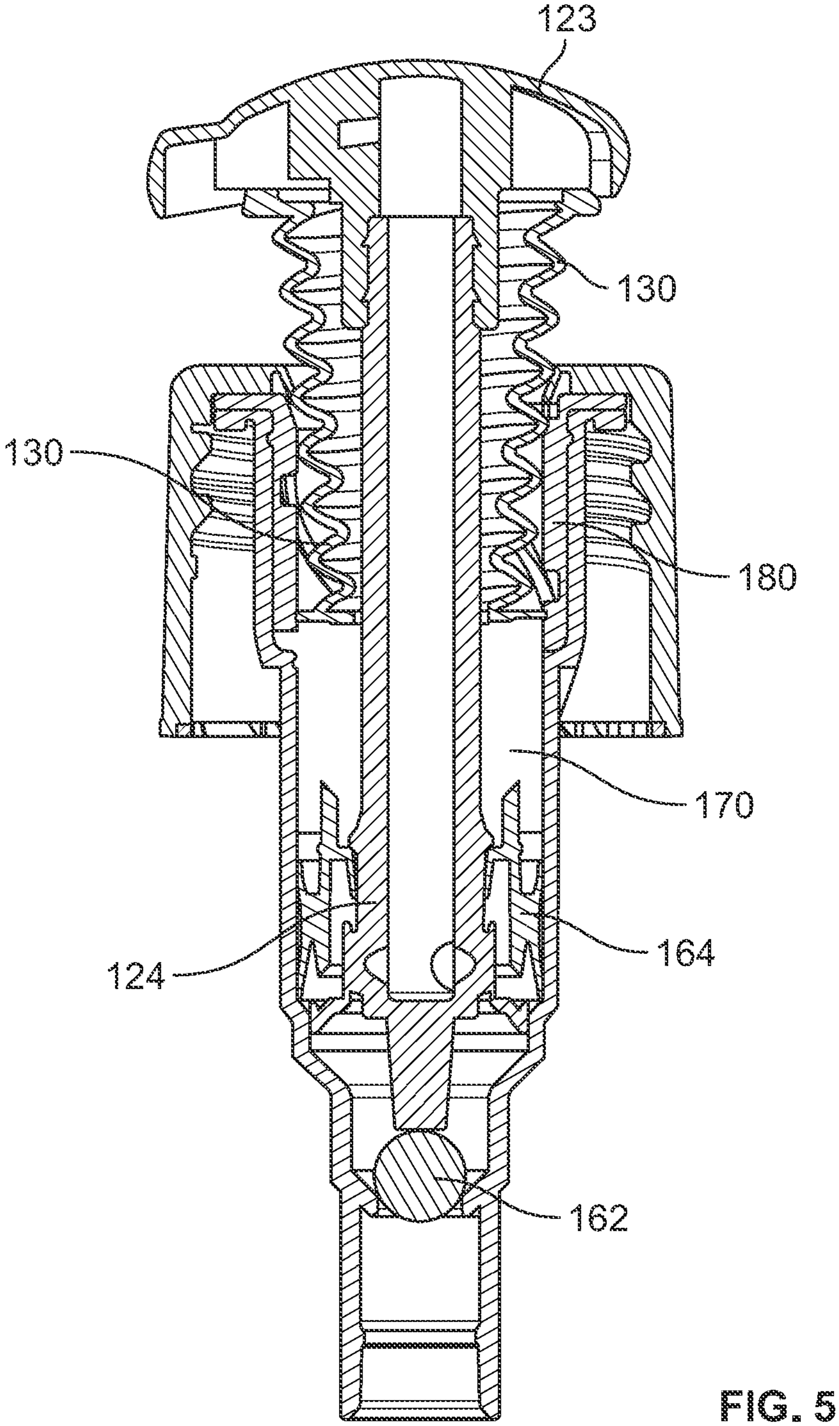
FIG. 5 is a cross sectional view of the pump in FIG. 4.
Figure 6A:
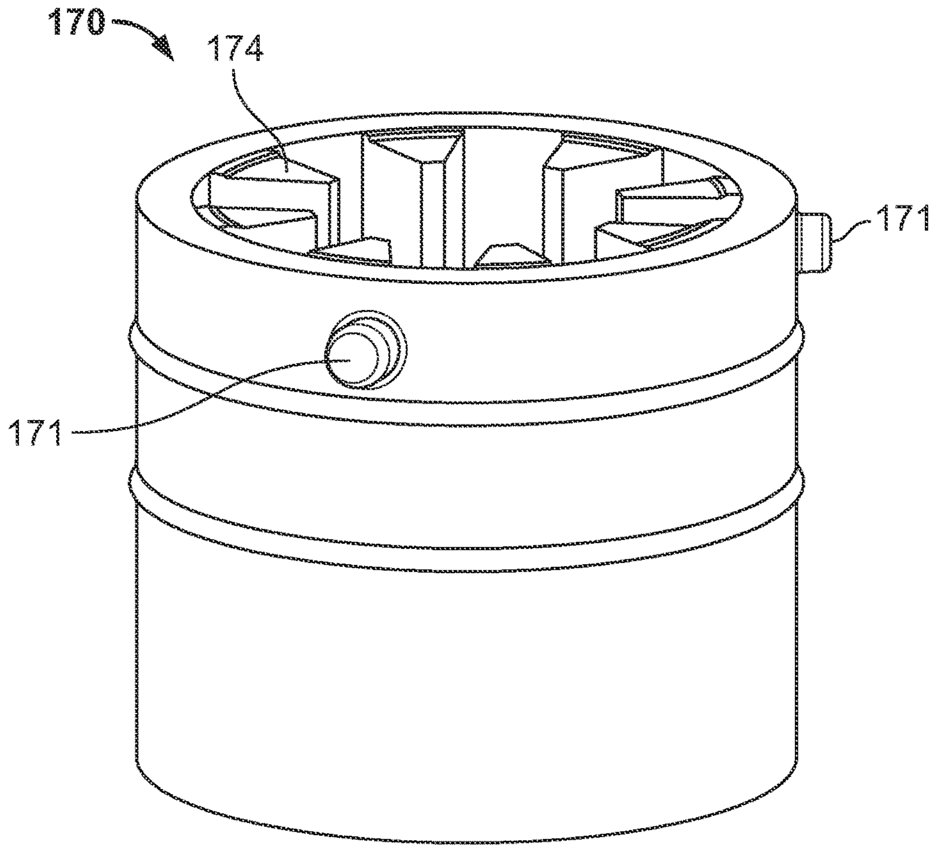
Figure 6B:
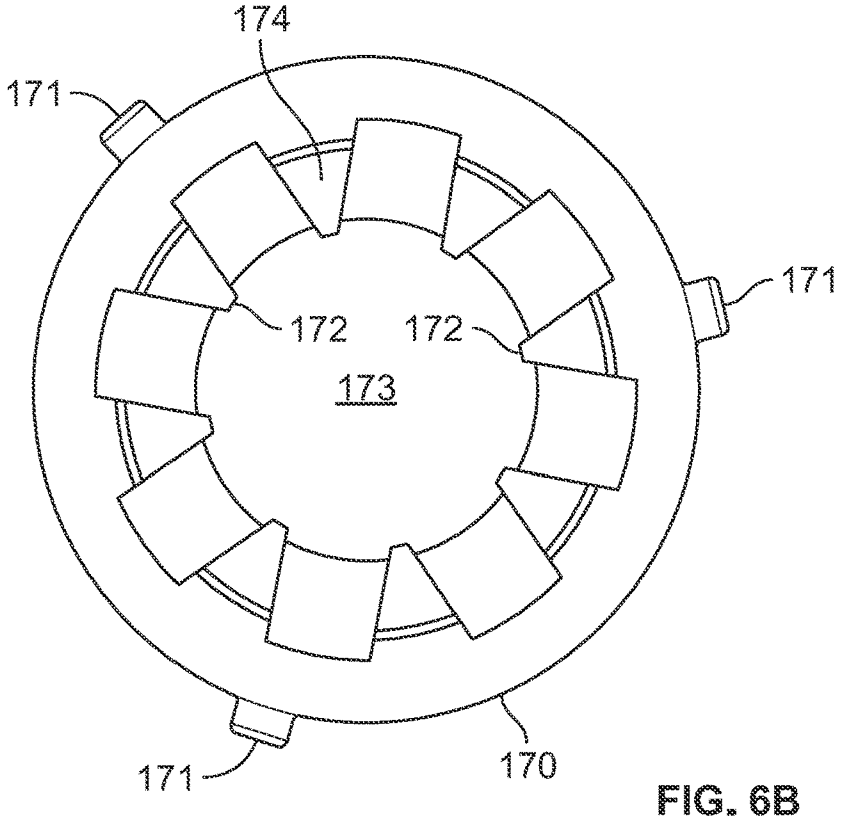
FIG. 6B is a top plan view thereof.
Figure 7A:
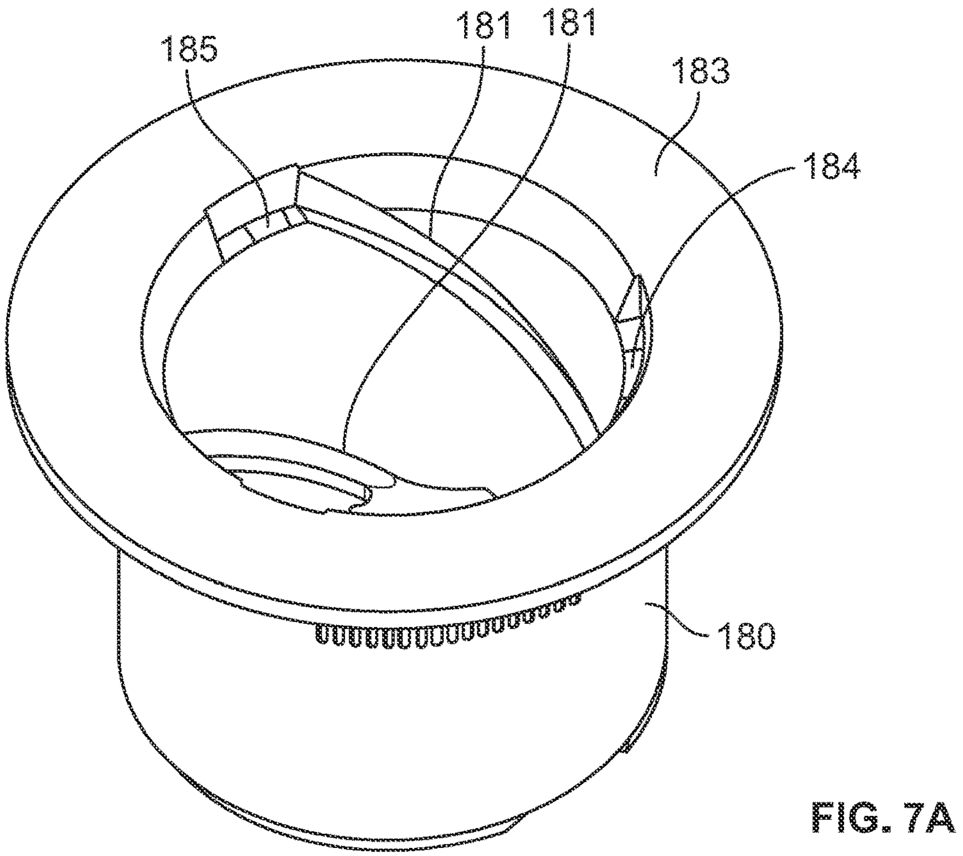
FIG. 7A is an isolated three dimensional perspective view of the insert housing.
Figure 7B:
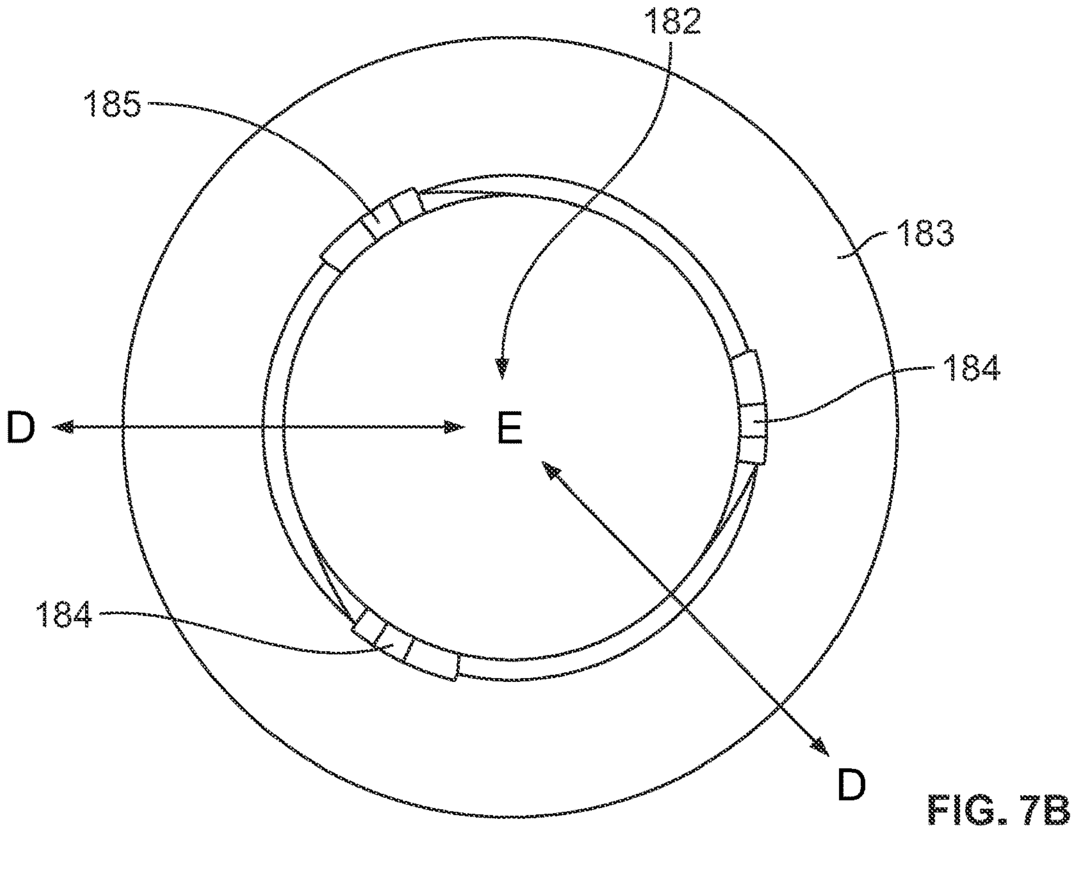
FIG. 7B is a top plan view thereof.
Figure 7C:
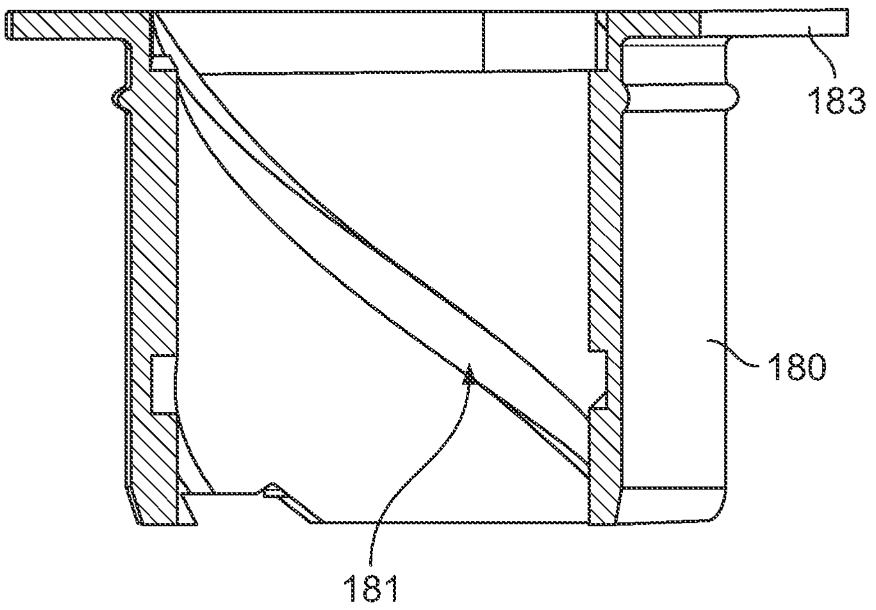
FIG. 7C is sectional side view taken along lines D-E-D in FIG. 7B.
Figure 8:
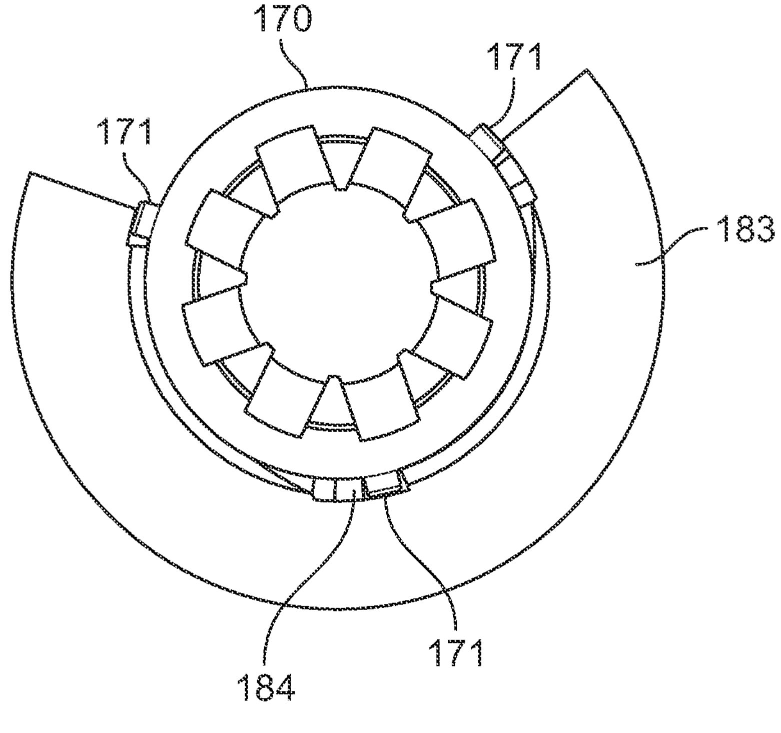
FIG. 8 is a top plan view of the sliding insert fitted within a sectional view of the insert housing, with a top arc section thereof omitted (the missing section roughly corresponding to line D-E-D shown in FIG. 7B).
Figure 9A:
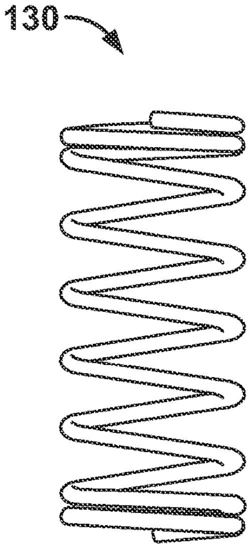
FIGS. 9A, 9B, and 9C are side plan views of biasing members that could be used in any of the disclosed aspects and embodiments.
Figure 9B:
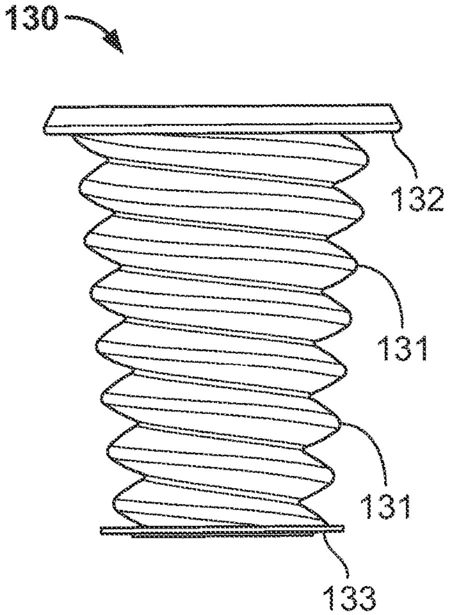
Figure 9C:
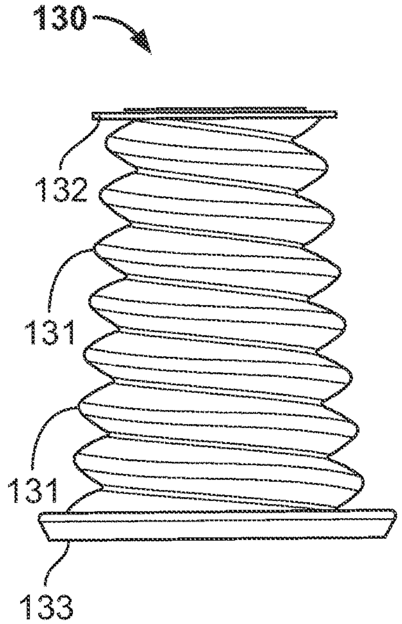
Figure 10:
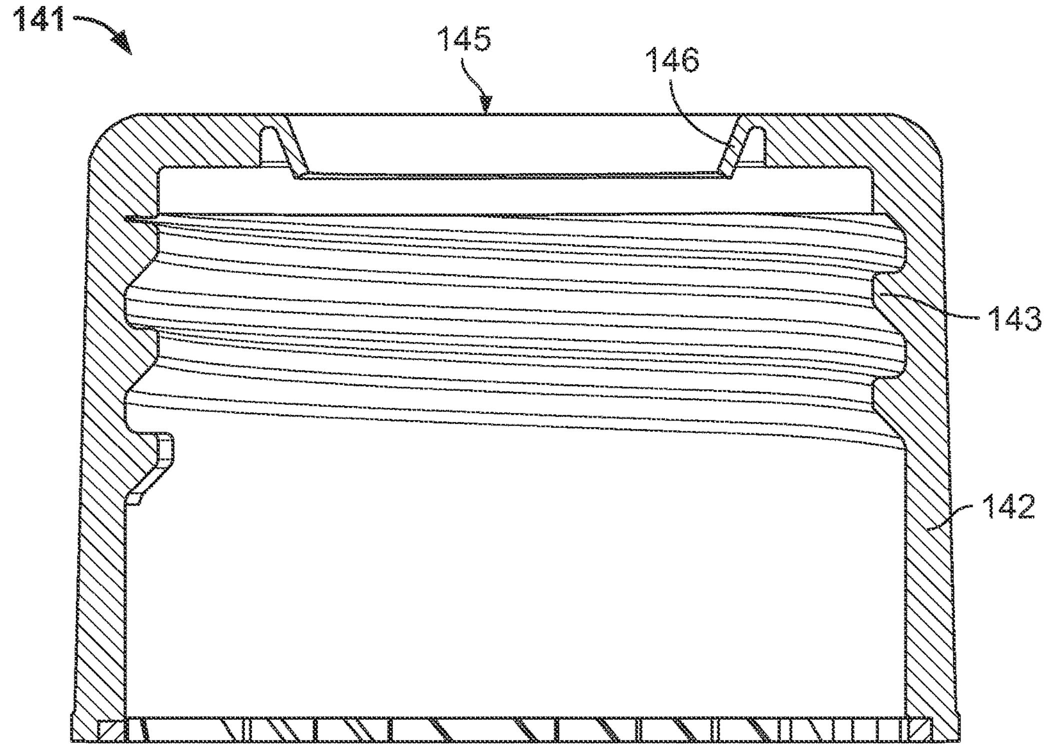
FIG. 10 is an isolated cross sectional side view of the closure.

While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Generally speaking, a dispenser pump made from all recyclable materials is contemplated. The pump includes separate up and down lock functionality for the actuator head to make it more compact for shipment. Further, in the locked down position, the biasing element is not substantially compress the biasing element (i.e., it is less than 25%, less than 10%, less than 5%, and most preferably not compressed). In some embodiments, the biasing element may remain slightly compressed so as to allow the projections of the sliding insert to remain seated in the cooperating stop elements formed on the interior of the housing. In this manner, the biasing element can be made from the same type of plastics as the other parts, while still delivering a pump that is suitable for e-commerce shipment. Further, the biasing member is not subjected to unnecessary stress normally associated with the down-locked position.

The dispenser pump relies upon at least two distinct states: an up-locked or operating state and a partially and/or fully down-locked or stocking state. In the former, the actuator head is fully extended (at the urging of the biasing member), whereas the latter conceal significant portions within the container to which the pump is affixed. Thus, the stocking state reduces the axial height of the pump but, owing to operation of the sliding insert and the insert housing, the biasing member is not substantially compressed.

Turning to the drawings, pump dispenser 100 includes an actuator portion 120 having a dispensing port or outlet nozzle 121, a closure portion 140, and pump body portion 160 including an inlet 161 that is governed by valve 162. Closure portion 140 is formed so as to be attachable to a container (not shown), preferably by way of a screw-type or other fitting engagement as is known in this field.

Inlet 161 and outlet 121 define a flow path for liquids or other flowable materials to be dispensed by pump 100. The liquids or flowable materials are confined within a container and drawn through the pump 100 by way of suction created by the reciprocating action of the actuator 120 and selected components of the pump body 140. The closure portion 140 is preferably sized so as to be easily adapted and attached to any number of standard container necks.

Actuator 120 includes a shroud piece 123 that may engage the closure 140 in some embodiments, although in the operating position actuator 120 moves freely up and down relative to closure 140. Biasing member 130, such as an all-plastic bellows spring, is fitted to an interior facing/underside of the shroud 123. A duct or tube 124 is coaxially contained with the biasing member 130. The outer top facing of the tube 124 and the inner portions of the shroud 123 which serve to further define the flow path and/or outlet 121 may be formed with cooperating features (e.g., bead and groove, snap fittings, screw thread, stopping/positioning flange, etc.) to ensure these elements remain coupled together. Shroud 123 may also encase similar cooperating engagement features to attach to the top end of the biasing member 130.

To the extent that the weight of the actuator 120 can be minimized, the construction of the biasing member 130 can be adjusted accordingly, although it will be apparent that the biasing force exerted by member 130 must be sufficient to raise the actuator 120 upward. Biasing member must also possess sufficient shape memory and resilience to withstand repeated use. Olefinic materials, including but not limited to polypropylene, polyethylene, and the like, should be particularly useful for forming the biasing member 130, especially in view of the all-plastic aims of this invention.

Biasing member 130 is generally cylindrical in shape, although it may be imparted with a tapered and/or conical shape. When present, the narrowing portion of the taper may be oriented downward proximate to the body 140/closure 140, although it is possible to position this narrowed end upward to attach to the actuator 120. A spiraled or helical bellows 131 imparts an accordion-like construction to facilitate compression and resilient restoration of the biasing member 130 to its extended shape. Alternatively, a series of flexing, indents and extensions could be used to create the same accordion-like structure. A more conventional metal or plastic spring, formed as a coil, could be substituted. Top and bottom flanges 132, 133 may include engagement features to secure and seal the biasing member 130 within the adjacent components of pump 100 (e.g., actuator 120, body 160, etc.).

Closure 140 includes a cylindrical cap 141. The upper portion of the cap may include features to engage the actuator 120, while the lower portion has a cup-like shape defined by annular skirt 142. Threads 143 are formed on an inner facing of the skirt 142 to engage the container neck. An annular panel 144 extends radially inward to define an aperture 145 for receiving and accommodating the biasing member 130 and tube 124.

A sealing flange 146 may extend into the aperture 145 from the inner-facing edge of panel 144. Flange 146 may be angled or otherwise constructed to ensure a sufficient seal is formed when the pump 100 is in a stocked position, particularly with respect to preventing fluid ingress into the inner recesses of the pump 100. Further, panel 144 may be formed with one or more raised or lowered portions 147 (relative to the horizontal axis) so as to engage and accommodate connection to the pump body portion 160.

Body portion 160 includes a piston housing 163 and a sliding piston 164 fitted within the lower portion of the housing 163 to define a variable volume pump chamber 165. In particular, owing to the reciprocating action created by biasing member 130, the piston 164 is urged upward and downward through the chamber 165, with upward motion creating suction that temporarily displaces/opens valve 162 to draw fluid through the inlet 161 and into the chamber. Upon downward motion (usually initiated by depressing the actuator 120 and temporarily compressing the biasing member 130), piston 164 moves downward while allowing fluid to flow around it and into tube 124. Eventually, owing to continued fluid pressure from actuation, fluid in the tube 124 will eventually be expelled through outlet 121. Separately, interposed between piston 164 and biasing member 130, a sliding insert 170 is confined within an insert housing 180. In turn, housing 180 is fitted within the housing 163, which may include an annular ridge, ledge, or flange to secure the housing 180 therein.

Notably, insert 170 is coaxially received within the housing 180. The insert 170 will rotate and move upward or downward, depending upon the rotation of actuator 120. More specifically, owing to the fixed connection between the biasing member 130 and formations 174 spaced regularly or irregularly on top of the insert 170 (but in a manner that cooperates with corresponding features on the flange 132 or 133), these items will move in concert when the actuator shroud 123 is rotated.

One or more projections 171 formed along an outer facing of the insert 170 then move through guides 181, provided as channels, grooves, or ledge-like formations positioned along the inner facing of housing 180. Ideally, guides 181 have a helical shape so as to allow smooth rotation and movement of the actuator 120. In other embodiments, guides 181 could have a straight vertical orientation or even a stepped or other variable pattern. Preferably, the same number of projections 171 and guides 181 are provided. When two or more projections 171 are present, they should be spaced apart, preferably at even and equal intervals, to ensure smooth movement and rotation.

Insert 170 will have a hollow tubular construction, preferably with a circular cylindrical shape. One or more flanges may be formed in arced sections along the top of the insert 170 to serve as the projections 171. Along the inner facing of the insert 171, ribs 172 can be provided to help position and guide the tube 124, which will slide freely through this central aperture 173. Further, at the bottom of insert 170, preferably on an inner facing, a groove, channel or other attachment feature will selectively receive and engage the piston 164. Similarly, the lower end of tube 124 has a pair of vertical spaced apart ridges or engagement features, also to urge the piston 164 into proper position within chamber 165.

Insert 170 is of sufficient diameter to extend almost completely below the insert housing 180 when the pump is in the stocked position. In some embodiments, projections 171 engage the ledge on the housing 163 that serves to restrain the insert housing 180. By moving to this lower position, the biasing member 130 is mostly or completely received within the inner volume normally occupied by the body portion 160. The spacing and size is such that biasing member 130 will not be substantially compressed in this stocked position. In the same manner, the tube 124 and piston 164 are configured at sufficient axial heights to ensure all components will be accommodated within the housing 163 and, more specifically in some instances, the chamber 165.

Conversely, when the insert 170 is in the operating or up-locked position (by virtue of projections 171 resting in their appropriate stoppers 184), the sliding insert 170 remains fixed in an up position, at or nearly flush with panel 144. Here, when the actuator 120 is depressed, the biasing member 130 is compressed while the tube 124 and associated, moveable components in the body portion 160 move downward. Upon release of the actuator 120, biasing member 130 urges these components upward and, in that process creates suction within the chamber 165.

Insert housing 180 is also a hollow tube having an identical circular cylindrical shape on its inner aperture/bore 182. The inner diameter of insert housing 180 accommodates the outer diameter of sliding insert 170 and, in the stocked position, most or all of the biasing member 130. As noted above, guides 181 are formed on the inner facings of the aperture/bore 182. In addition, stoppers 184 may be provided at the top and/or bottom edges of guide 181. Stoppers 184 are substantially horizontal ledges on which the projections may rest. Ramped sections 185 may be interposed between the main, vertical channel defined by guide 181 and the stopper ledge 184, so as to help keep the projections 171 seated on the stopper 184. Ramps 185 will be formed to require a certain level of torque is needed to move the pump 100 from operating to stocked positions (or vice versa).

Notably, the outer shape (and diameter) of the insert housing 180 does not necessarily need to retain the circular cylindrical shape of the insert 170. Instead, the outer facing of housing 180 only needs to fit in and cooperate with the piston housing 163.

An annular flange 183 is formed at the top of housing 180. This flange 183 helps attach and seal the body portion 160 to the closure 140. While only completely up and completely down positions are shown for the insert 170 and housing 180 combination, additional stoppers 184 and/or ramps 185 could be formed at a midway position.

Figure 11:
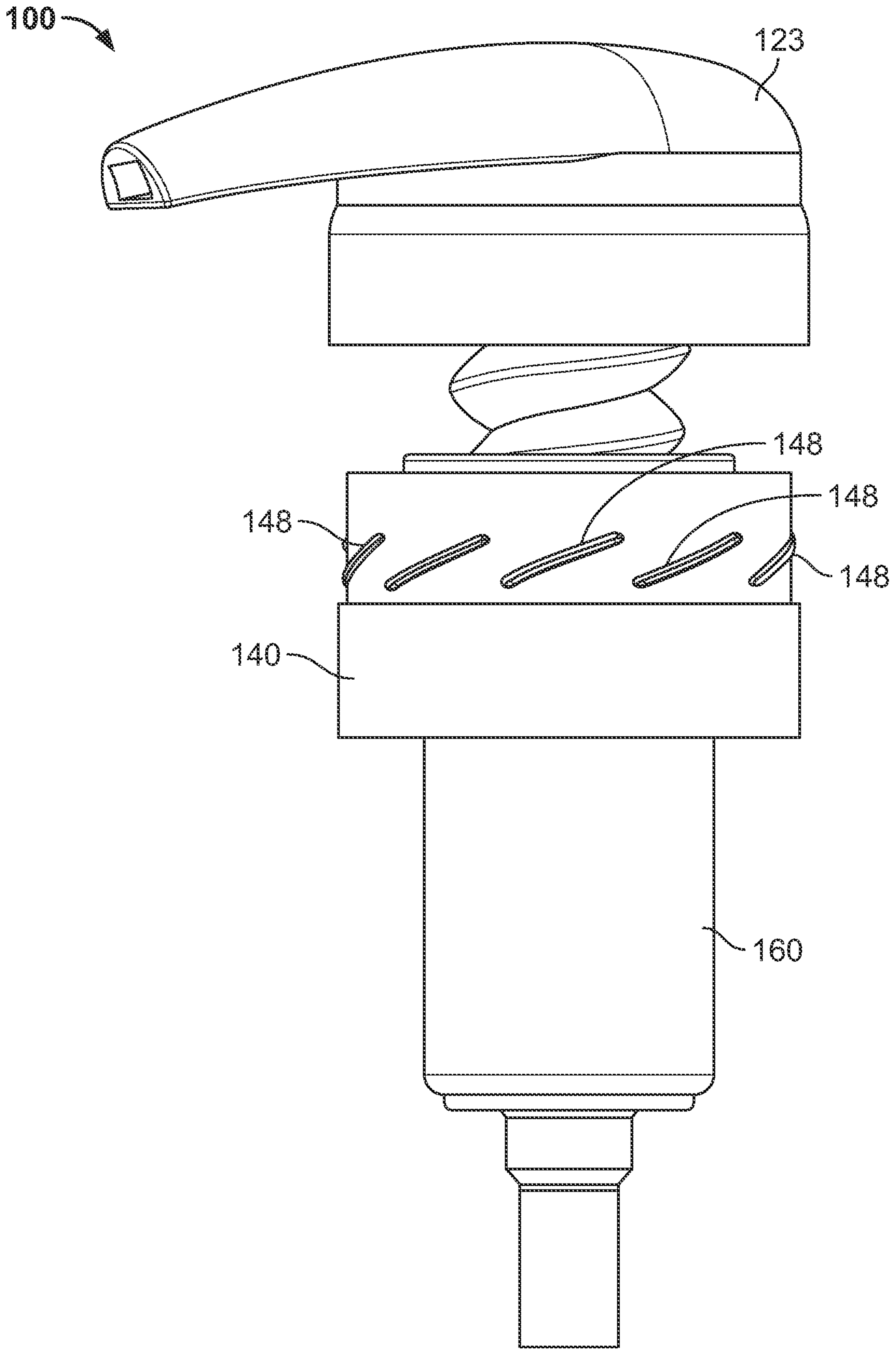
FIG. 11 is a side view of the pump exterior in the operating or up locked position according a third embodiment.
Figure 12:
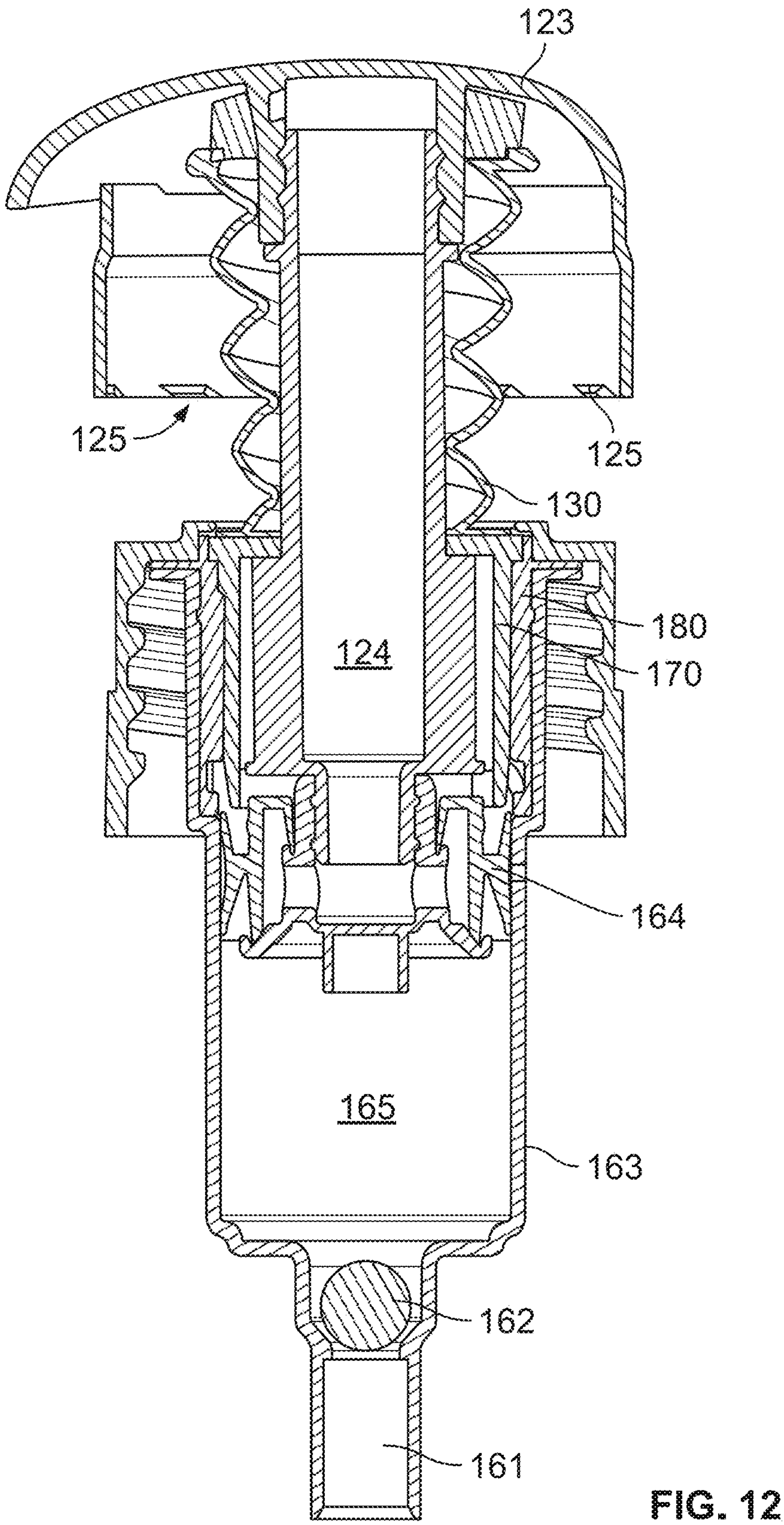
FIG. 12 is a cross sectional view of the pump in FIG. 11.
Figure 13:
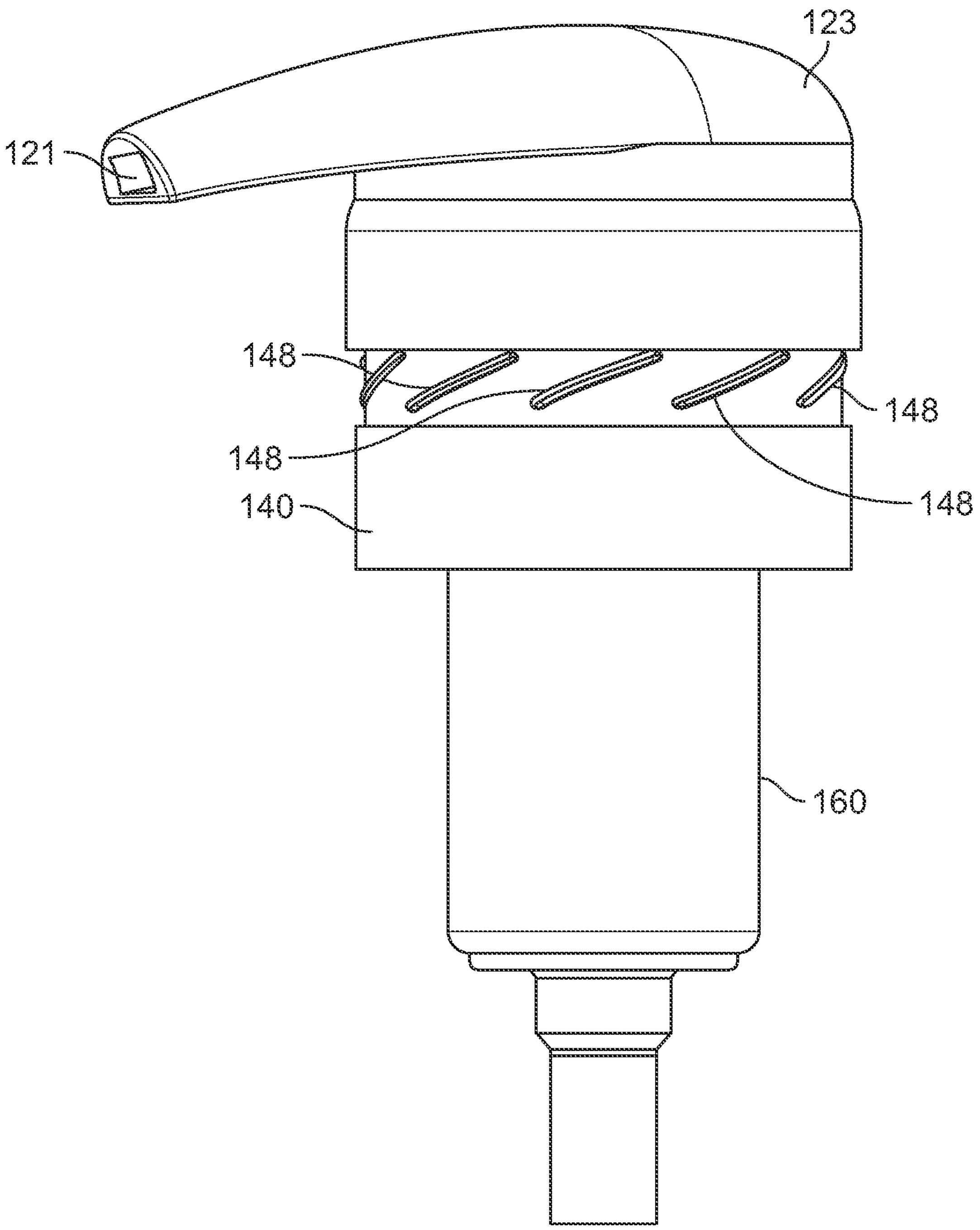
FIG. 13 is a side view of the pump exterior in a partially down locked position according to the third embodiment.
Figure 14:
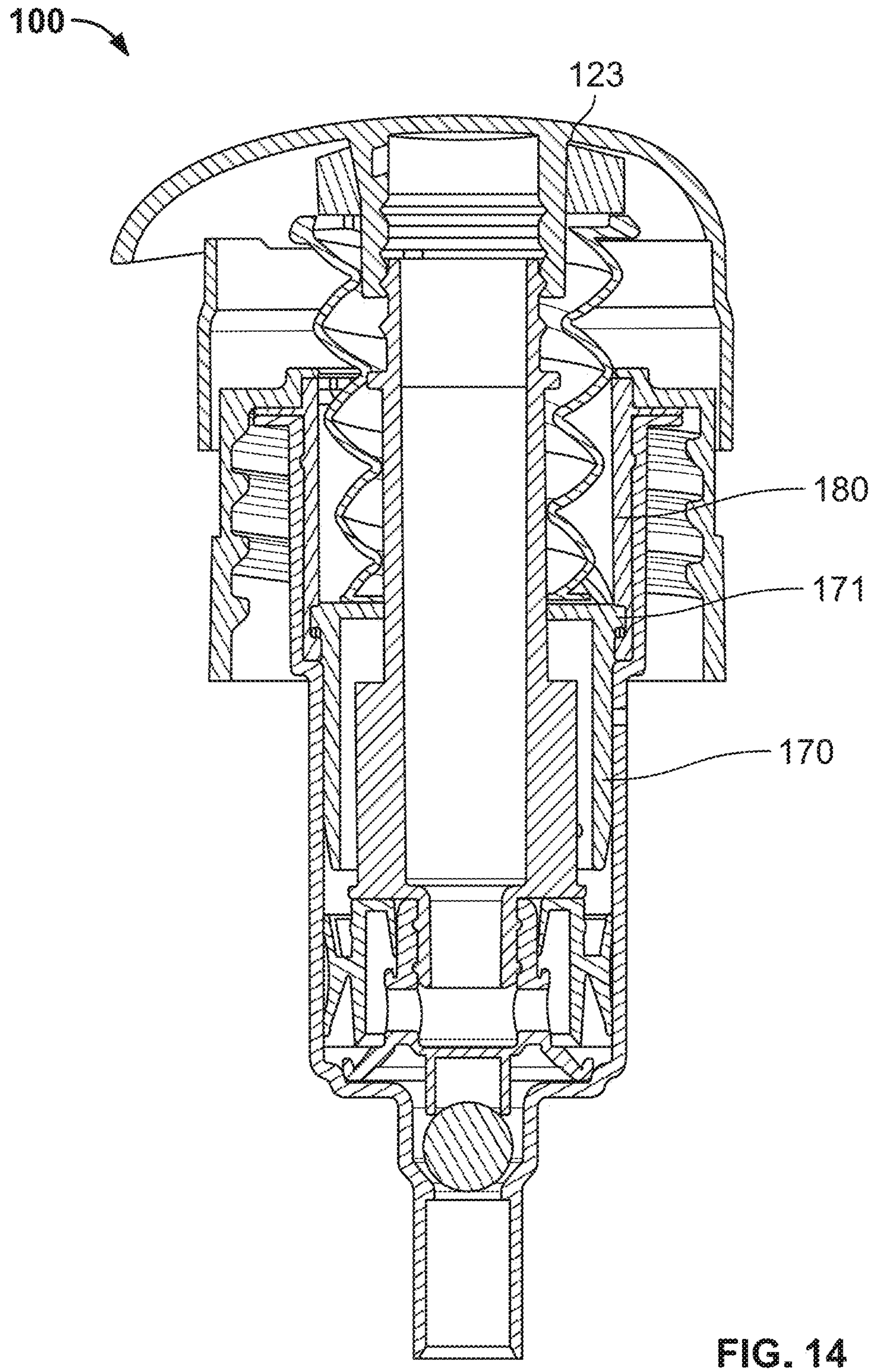
FIG. 14 is a cross sectional view of the pump in FIG. 13.
Figure 15:
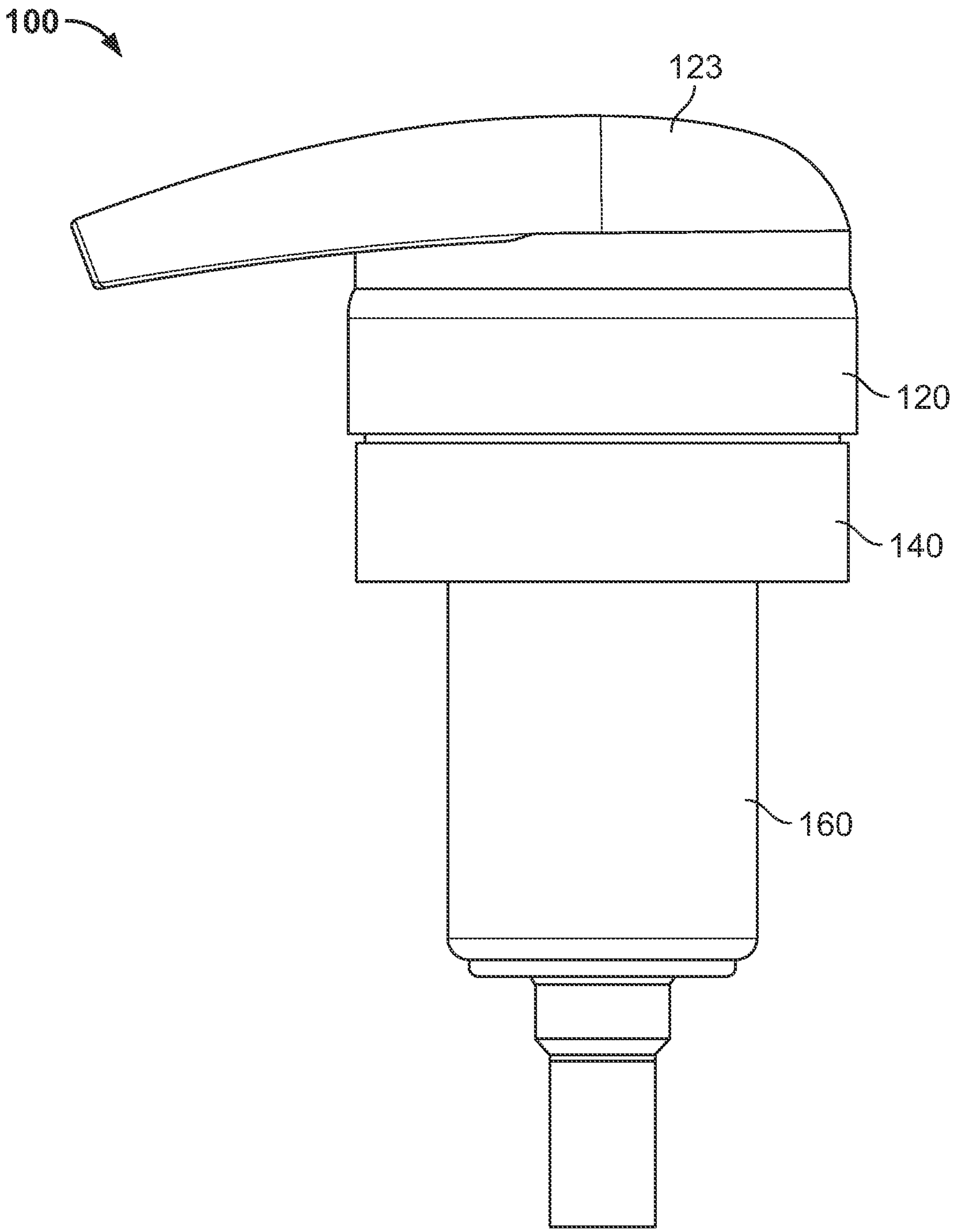
FIG. 15 is a side view of the pump exterior in the fully down locked position according a third embodiment.
Figure 16:
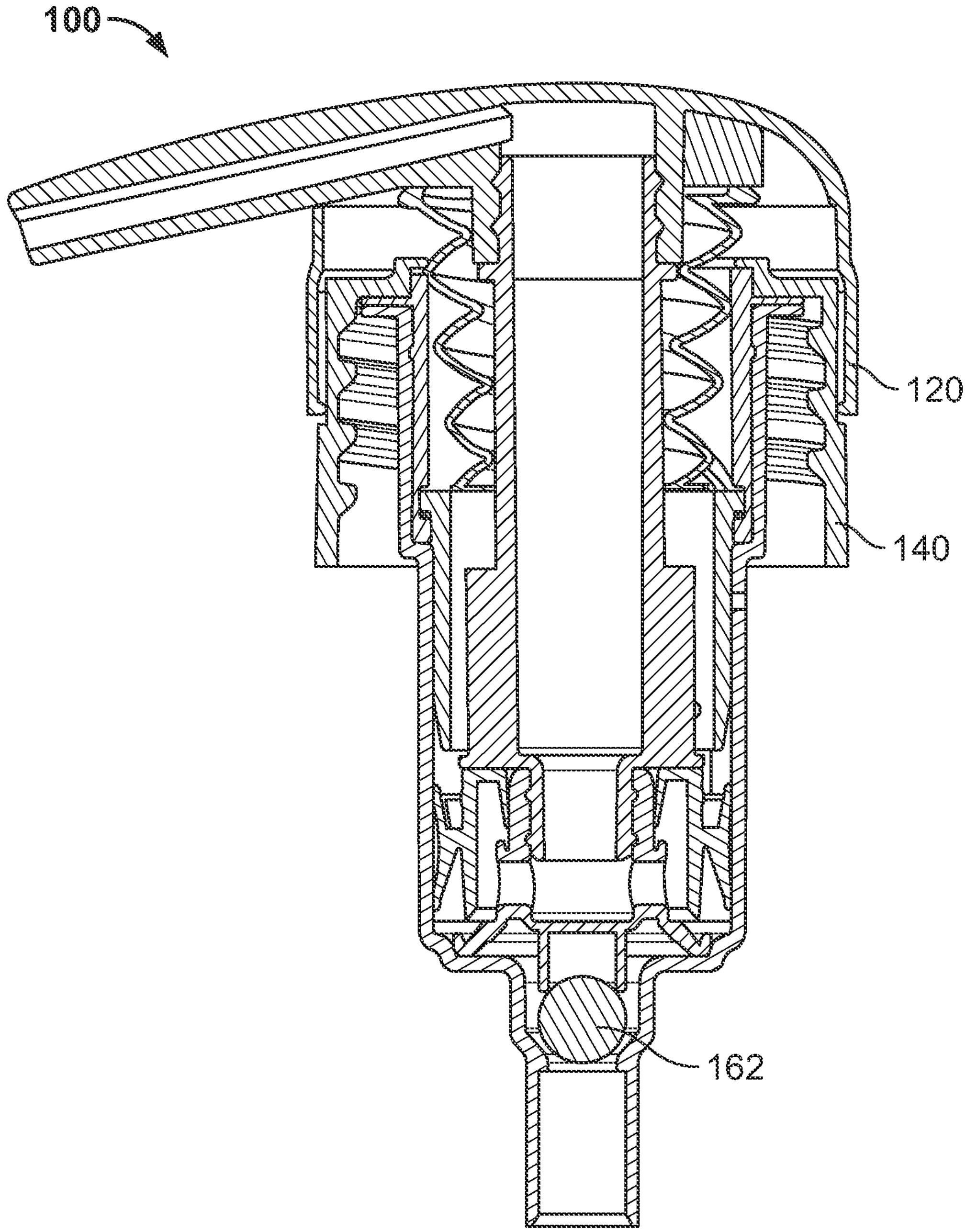
FIG. 16 is a cross sectional side view of the pump in FIG. 15.
Figure 17:
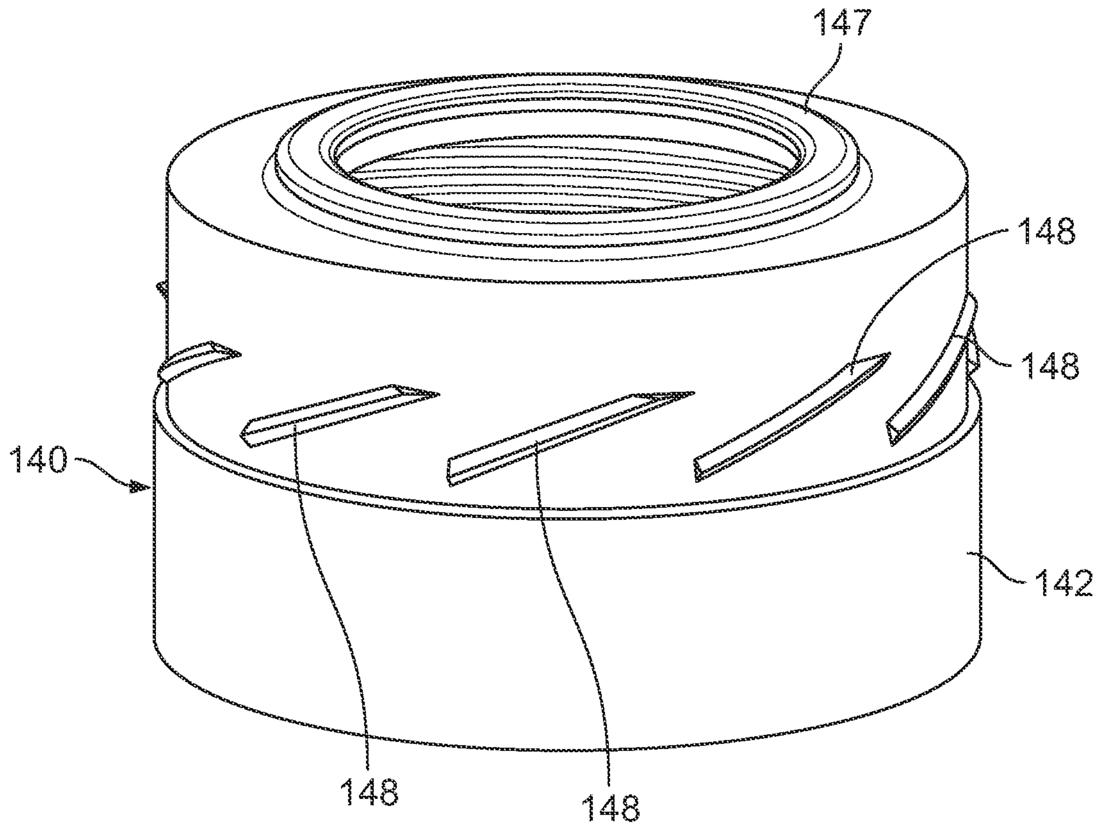
FIG. 17 is an isolated three dimensional perspective view of the closure according to the third embodiment.
Figure 18A:
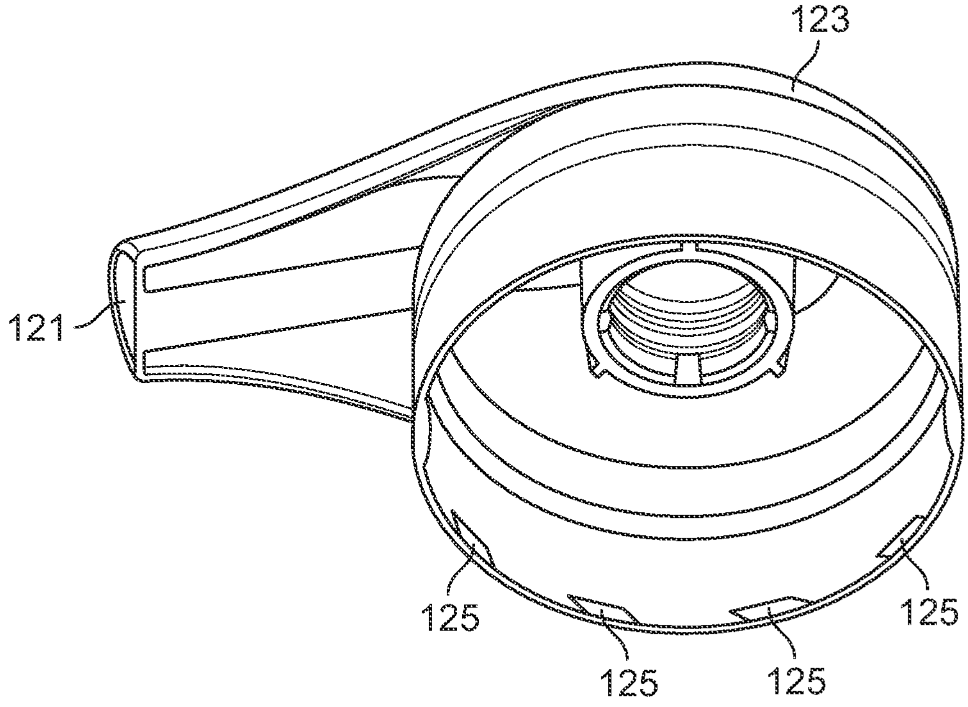
Figure 18B:
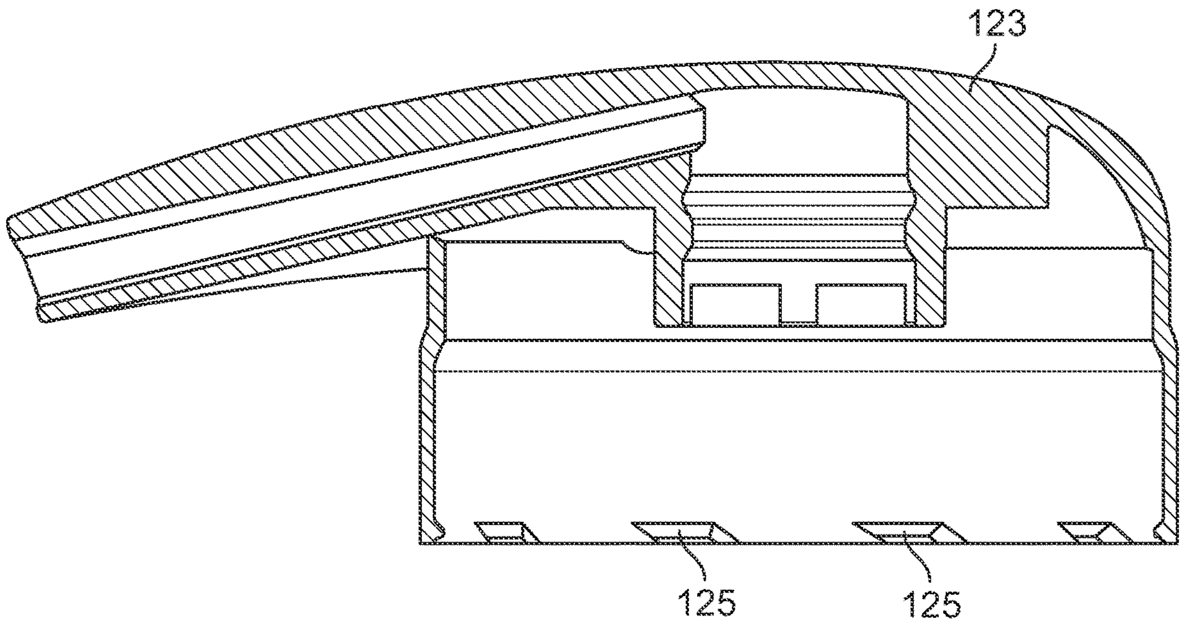
FIG. 18B is a cross sectional side view of the actuator head in FIG. 18A.

In a further embodiment, additional locking features can also be formed on the exterior facing of the closure 140 and the inner recess defined by the shroud 123. As seen in FIGS. 11, 13, 17, 18A, and 18B, one or more radially inward indents or formations 125 are provided on the inner facing of the shroud 123. Correspondingly, one or a series of spaced apart projections 148 are formed on an outer facing of the closure cap 141, possibly in the skirt 142 and/or at an upper portion.

When the actuator 120 (and more specifically, the shroud 123) is rotated appropriately, the indents 125 pass between the spaces between the projections 148. In some embodiments, the projections 148 may be similar to guides, having a sloping or slanted surface to facilitate the rotation of the actuator 123. In either case, when the actuator 120 is further rotated (in the same or an opposite direction), the indents 125 catch on a portion of the projections 148 so as to capture and retain the actuator 120 in a down-locked position. Depending upon the axial height of the projections 148 relative to the sliding action of the insert 170 within its housing 180, the indents 125/projections 148 may form a fully down-locked position or they may simply provide a partial down lock. In either case, the indents 125/projections 148 provide an additional safeguard against unwanted release of the actuator 120.

Equally significant, the indents 125/projections 148 can be placed in radial positions around the periphery to facilitate the twisting motion imparted by the helical guides 181 and/or to terminate so as to coincide with a resting position of projections 171 on stoppers 184. In this manner, these further embodiments support the operational and stocked positions that help preserve and protect the biasing member.

In general, the pump bellows/biasing member 130 serves as a replacement for metal biasing springs. By affixing the bellows to a carrier element and allowing that carrier element to toggle between up and down locked positioned by engaging radial projections into corresponding beads, grooves, or aperture-like structures on an inner facing of the pump body, the bellows can be concealed within the container neck and the pump chamber without compression. When released, the projections slide freely along that inner surface so as to allow normal actuation and reciprocation of the pump.

For further background on the operation and construction of accordion-style bellows, U.S. Pat. Nos. 6,672,486; 7,246,723; and 10,252,841, as well as United States Patent Publications 2018/318861; 2017/216864; US 2009/0206091; and 2007/0241135 for segmented dome actuators, are incorporated by reference. These publications also provide further examples and advantages of all-polymer (or all-olefin) pump dispensers and biasing mechanisms. It is envisioned that the sliding and lockable mechanisms provided herein will accommodate any of these designs.

It will also be understood that, while the use of metal springs may not be desirable in certain context, metal springs can nevertheless be incorporated in certain aspects and embodiments of this invention.

Generally speaking, all components should be made of materials having sufficient flexibility and structural integrity, as well as a chemically inert nature. The materials should also be selected for workability, cost, and weight. Common polymers amenable to injection molding, extrusion, blow molding, or other common forming processes should have particular utility.

References to coupling in this disclosure are to be understood as encompassing any of the conventional means used in this field. This may take the form of snap- or force fitting of components, although threaded connections, bead-and-groove, and slot-and-flange assemblies could be employed. Adhesive and fasteners could also be used, although such components must be judiciously selected so as to retain the recyclable nature of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

The illustrations in the attachment include details as to the operation and use of the various embodiments. Such details should be deemed as fully disclosed and embraced by this written description.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

The invention claimed is:

1. A dispenser pump capable of being locked in operational and stocking positions without unwanted compression of components, the pump comprising:
- an actuator defining a fluid flow path having an outlet and attached to a top end of a biasing member;
- a closure body including a cylindrical skirt and a central aperture which allows for reciprocating motion of the actuator therethrough;
- a pump body having a sliding insert received within an outer housing fixed to the closure body, the outer housing coaxially receiving portions of the actuator within a pump chamber formed inside the outer housing, the sliding insert positioned above the pump chamber and having an insert housing fixed to the outer housing and a sliding member attached to a bottom end of the biasing member and fitted coaxially within the insert housing; and
- wherein guides and stoppers formed on an inner facing of the insert housing cooperate with projections extending radially outward from an outer facing of the sliding member so as to allow the actuator to be selectively locked upwardly in an operable position and locked downwardly in a stocked position without substantial compression of the biasing member.

2. The pump of claim 1, wherein the biasing member comprises a bellows.

3. The pump of claim 2, wherein the bellows have a tapered or conical shape.

4. The pump of claim 2, wherein the bellows include flanges which separately attach to the actuator and the insert.

5. The pump of claim 1, wherein the sliding insert and insert housing form cooperating, coaxially hollow tubes.

6. The pump of claim 5, wherein the guides are formed on an inner facing of the insert housing.

7. The pump of claim 6, wherein the projections are formed on an outer facing of the sliding insert.

8. The pump of claim 1, wherein the guides follow a helical path on an inner facing of the insert housing.

9. The pump of claim 1 wherein a sealing flange is formed on the closure body proximate to the central aperture.

10. The pump of claim 1, wherein indents are provided on inner facing of the actuator, said indents cooperating with outer projections formed on an outer facing of the closure body so as to define a second stocked position.

11. The pump of claim 10, wherein the outer projections are angled.

12. A dispenser pump capable of being locked in operational and stocking positions without unwanted compression of components, the pump comprising:

an actuator defining a fluid flow path having an outlet and attached to a top end of a biasing member;

a closure body including a cylindrical skirt and a central aperture which allows for reciprocating motion of the actuator therethrough;

a pump body having a sliding insert received within an outer housing fixed to the closure body, the outer housing coaxially receiving portions of the actuator within a pump chamber formed inside the outer housing, the sliding insert positioned above the pump chamber and having an insert housing fixed to the outer housing and a sliding member attached to a bottom end of the biasing member and fitted coaxially within the insert housing; and wherein guides and stoppers formed on an inner facing of the insert housing cooperate with projections extending radially outward from an outer facing of the sliding member so as to allow the actuator to be selectively locked upwardly in an operable position and locked downwardly in a stocked position without substantial compression of the biasing member; and wherein ramps are interposed between the guides and stoppers.

13. A dispenser pump capable of being locked in operational and stocking positions without unwanted compression of components, the pump comprising:

an actuator defining a fluid flow path having an outlet and attached to a top end of a biasing member;

a closure body including a cylindrical skirt and a central aperture which allows for reciprocating motion of the actuator therethrough;

a pump body having a sliding insert received within an outer housing fixed to the closure body, the outer housing coaxially receiving portions of the actuator within a pump chamber formed inside the outer housing, the sliding insert positioned above the pump chamber and having an insert housing fixed to the outer housing and a sliding member attached to a bottom end of the biasing member and fitted coaxially within the insert housing; and wherein guides and stoppers formed on an inner facing of the insert housing cooperate with projections extending radially outward from an outer facing of the sliding member so as to allow the actuator to be selectively locked upwardly in an operable position and locked downwardly in a stocked position without substantial compression of the biasing member; and wherein the insert housing is coaxially fitted within the outer housing so as to rest upon annular ledge formed on an inner surface of the outer housing immediately above the pump chamber.

* * * * *